W. D. COOLIDGE.
ELECTRIC FURNACE.
APPLICATION FILED SEPT. 23, 1908. RENEWED DEC. 15, 1911.

1,096,414.

Patented May 12, 1914.

Witnesses:
J. Ellis Glen.
J. Earl Ryan.

Inventor:
William D. Coolidge,
by ............
Att'y.

UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

ELECTRIC FURNACE.

1,096,414.  Specification of Letters Patent.  Patented May 12, 1914.

Application filed September 23, 1908, Serial No. 454,451. Renewed December 15, 1911. Serial No. 666,037.

*To all whom it may concern:*

Be it known that I, WILLIAM D. COOLIDGE, a citizen of the United States, residing at Schenectady, county of Schenectady, State of New York, have invented certain new and useful Improvements in Electric Furnaces, of which the following is a specification.

My present invention relates to electric furnaces and comprises a furnace of the resistance type suitable for general use in the arts and having special advantages for the production of very high temperatures, such as are used in the production of lamp filaments of refractory metals and materials.

My improved furnace includes a tube of alumina wound with a heating coil of platinum or other refractory metal. It has a hot zone free from chemically active vapors and well suited for the treatment of materials sensitive to contamination by such substances as carbon vapors, or the vapors of silicious material.

For a better understanding of my invention, reference may be had to the following detailed description taken in conjunction with the accompanying drawings, in which—

Figure 1:
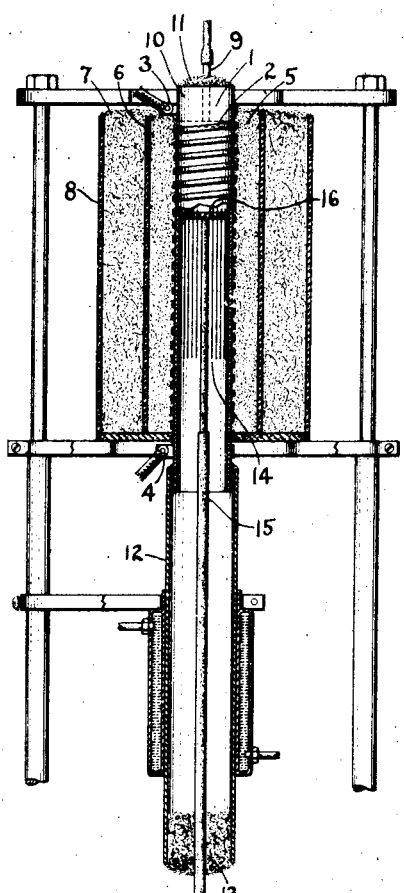
Figure 2:
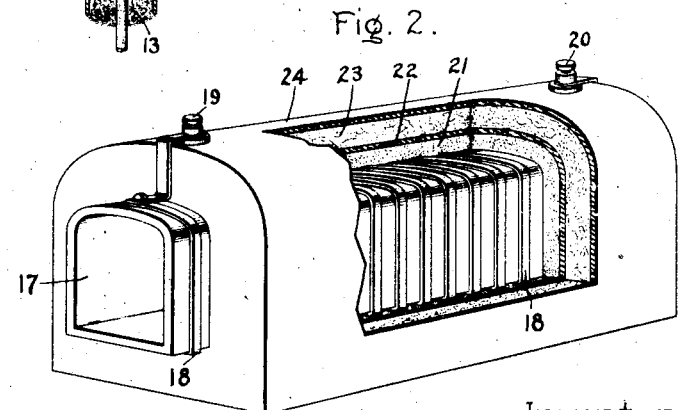

Figure 1 is a sectional elevation of a furnace arranged for the treatment of lamp filaments, and Fig. 2 is a perspective view, partly diagrammatic, of a furnace suitable for dental work or general industrial use.

The apparatus illustrated in Fig. 1 comprises a refractory tube 1 of alumina about which is a spiral winding 2 of platinum ribbon. This alumina tube may be made by electrical methods including actual fusion of the alumina, or may be made by mixing powdered alumina with a binder, such as tar or paraffin, and then baking and firing to a high temperature, say 1400 to 1500 degrees C. in an Arsem vacuum furnace. The platinum ribbon 2 is provided at its ends with terminals or binding posts 3, 4 whereby electrical energy can be supplied to the platinum strip to heat the alumina tube. A packing of powdered alumina 5 incloses the platinum winding, except at its extreme ends, and serves not only to prevent radiation of heat outward from the tube, but also prevents contamination of the platinum by gases or vapors such as might be developed by a less refractory packing. In this respect it is far superior to silicious material. An earthen tube 6 serves to retain the powdered alumina packing, and this tube is in turn surrounded by asbestos fiber 7 held in an earthenware pot 8. When this furnace is in operation for the production of lamp filaments, the alumina tube stands vertical and is supplied at the top with a stream of hydrogen introduced through a copper tube 9 entering through an asbestos block 10 packed about with asbestos fiber 11 to make a tight joint at the top of the tube. A water cooled iron tube 12 may be supported immediately below the alumina tube and serves as a sort of antechamber whereby filaments or other objects to be treated may be introduced or withdrawn from the hot zone of the alumina tube without danger of exposure to the air while in a heated and oxidizable condition. The lower end of the iron tube 12 may have a stopper 13 of porous asbestos fiber, whereby the hydrogen passing through the alumina tube can escape slowly into the air, or if desired, means may be provided for piping this hydrogen back through a circulating pump and then into the furnace again through the tube 9 at the top. This latter arrangement effects a large saving in hydrogen and, furthermore, permits the use of a rapid stream through the hot zone of the furnace without undue expense, for by returning the hydrogen to the furnace it may be used again and again with only such small additions as are necessary to compensate for leakage and for such amounts as may have been chemically used up in the treatment of materials in the furnace.

According to a process of lamp filament manufacture, as devised by me and described in other applications, I mix finely divided tungsten or other refractory metal or material with a warm, plastic alloy of cadmium, mercury and bismuth. This mixture is then extruded through a die to form wires which on subsequent treatment with heat give up their low melting metals in the form of vapor and finally sinter and shrink together into coherent filaments suitable for use in incandescent lamps. The furnace just described is of great value as a means for effecting the complete removal of such metal binder and the complete shrinkage and sintering of a refractory material such as tungsten.

For the production of tungsten filaments I mount the loops of unfinished wire 14 on a suitable standard or support consisting of an upright rod 15 of tungsten, alumina, or other inert material having at its top a transverse rod or bar 16 of similar material. If desired, the metal wires may previously have been given a baking or other treatment to remove the mercury and possibly some of the cadmium. Before introducing the filaments into the hot zone of the furnace I hold them for a time in the iron tube 12 so that they will be thoroughly washed off with hydrogen and thereby freed from air or other gaseous agent capable of oxidizing or otherwise reacting on the filament. I then raise the filaments into the hot zone of the alumina tube as indicated in the drawing. If the alumina tube is hot enough the metallic binder will immediately vaporize from the filaments and be driven away by the stream of hydrogen. As soon as the easily vaporized materials have been driven out, or possibly simultaneous with their removal, the filaments begin to shrink and sinter. So rapid is this action that in fifteen seconds it is possible to complete the removal of the binder and shrink the filaments as much as 27 per cent. of their original length. The duration of heat treatment necessary for complete shrinkage depends somewhat on the fineness of the tungsten, but in general, may be stated to be about 7 minutes. The alumina tube must, of course be very hot; but I find that the necessary temperature can easily be obtained with the arrangement described, and furthermore, that the apparatus is durable enough to stand continuous operation for weeks without renewal. After the shrinking is completed, the filaments are lowered into the iron tube 12 and there allowed to cool off for a minute or two before exposure to the air. They come out, not only perfectly sintered and stable in conductivity, but also of good shape. The legs are straight and the pointed end of each loop conforms perfectly with the shape of the rod on which the loops were suspended, which rod may be round or pointed. If desired, the treatment may be so conducted, as regards temperature and duration, that the shrinkage shall be only partial.

I think it proper to indicate that the alumina tube possesses special advantages for use in an apparatus of the type indicated. It is nearly, if not wholly, impervious to gases, particularly if made from fused alumina, and so protects the filament during the high temperature treatment from any foreign material in the neighborhood. What is equally important, it protects the platinum heating coil from the metallic vapors of cadmium and bismuth and from the oxids of tungsten given off by the filaments. Also, the platinum spiral wound on the alumina tube does not loosen up with use. The selection of the material for the standard or support on which the filaments are mounted during treatment is also a matter requiring attention. Silica cannot be used because the tungsten filaments stick at the point of contact. Iron is not good because of the liberation of vapors dangerous to the filament. In order that the filaments may come out straight and free from kinks, it is absolutely essential that they be not contaminated by any foreign substances. Tungsten and alumina are altogether suitable for this purpose.

Fig. 2 of the drawing shows diagrammatically a furnace suitable for dental work or general laboratory investigations. It comprises a muffle shaped heater tube 17 of alumina, preferably fused alumina, wound with a platinum ribbon 18 having terminals 19 and 20 and protected by a packing 21 of powdered alumina retained in place by an earthen tube 22 about which is a layer of asbestos fiber 23 having an outer envelop or casing 24 of fire clay or other suitable material. This furnace corresponds in many ways with that illustrated in Fig. 1 and shows the possibility of utilizing my invention in other ways than for the production of lamp filaments. In dental furnaces of the resistance type, the platinum wire is ordinarily wound on some special kind of fire clay, and the maximum temperature of such furnaces is only about 1370 degrees C., and furthermore, the platinum is subject to contamination by the silicious material of the tube and ordinarily becomes brittle and soft and finally crumbles away. My furnace provides a means for attaining much higher temperatures, with the advantage of not contaminating the platinum of the heater, and furthermore, with the very important advantage of not submitting the furnace-charge to silicious or carbonaceous vapors, or in fact to anything that would contaminate or injure even such a sensitive material as tungsten.

What I claim as new, and desire to secure by Letters Patent of the United States, is—

1. A furnace for the heat treatment of lamp filaments, comprising a vertical tube, means for heating said tube, means for freely suspending filaments within said tube but out of contact therewith, and means for supplying a gas to said tube.

2. A furnace for the treatment of metal lamp filaments, comprising a vertical tube, means for heating said tube, means for supplying hydrogen to the upper end of said tube, an inert transverse support for suspending a plurality of looped filaments means for raising said filaments into said tube for treatment.

3. A furnace for the treatment of refractory materials, comprising a tube of alumina, a conductor, disposed about said tube for heating it, means for supplying gas to one end of said tube, and a packing of alumina inclosing the hot zone of the tube.

4. In a furnace, the combination of a vertical alumina tube, means for heating said tube, and means for raising a plurality of unfinished lamp filaments into the hot zone of said tube and for withdrawing them therefrom while inclosed in hydrogen.

5. An electric furnace having a tube of alumina, a heating coil about said tube and an envelop of alumina inclosing said coil.

6. In an electric furnace, a tube of fused alumina having a heating coil of platinum.

7. The combination of an alumina tube, means for heating said tube, means for introducing filaments into said tube to be treated, and a cool antechamber at one end of said tube.

8. The combination of an alumina tube having a platinum heating coil, means for supporting unfinished filaments within said tube, means for supplying gas at one end of the tube, and a cool antechamber into which the filaments may be moved after heat treatment in said tube.

9. An electric furnace comprising a fused alumina tube, a platinum winding on the outside of said tube, an alumina packing for said winding, and a heat insulating packing inclosing said alumina packing.

10. In a furnace, the combination of a vertical tube closed at its upper end, an electric heating coil surrounding said tube, and an inert packing inclosing said tube and heating coil.

11. In an electric furnace, the combination of a tube of alumina having a heating coil of platinum surrounded by suitable refractory material.

12. An electric furnace comprising a tube of fused alumina, a heating coil about said tube, and an envelop of refractory material inclosing said coil.

In witness whereof, I have hereunto set my hand this 21st day of September, 1908.

WILLIAM D. COOLIDGE.

Witnesses:
 BENJAMIN B. HULL,
 MARGARET E. WOOLLEY.